United States Patent [19]
Petrunka et al.

[11] Patent Number: 5,987,116
[45] Date of Patent: Nov. 16, 1999

[54] CALL CENTER INTEGRATION WITH OPERATOR SERVICES DATABASES

[75] Inventors: Robert W. Petrunka, Raleigh, N.C.; Joseph Bosco, Chicago, Ill.

[73] Assignee: Northern Telecom Limited, Canada

[21] Appl. No.: 08/833,997

[22] Filed: Apr. 11, 1997

Related U.S. Application Data

[63] Continuation-in-part of application No. 08/760,111, Dec. 3, 1996.

[51] Int. Cl.$^6$ ...................................................... H04M 3/42
[52] U.S. Cl. ............................ 379/265; 379/211; 379/266
[58] Field of Search ...................................... 379/265, 266, 379/309, 93.23, 219, 220, 221, 229, 230, 211

[56] References Cited

U.S. PATENT DOCUMENTS

| | | | |
|---|---|---|---|
| 4,048,452 | 9/1977 | Oehring et al. ............................ | 179/27 |
| 4,289,934 | 9/1981 | Pitroda et al. ............................. | 179/27 |
| 4,466,098 | 8/1984 | Southard ..................................... | 371/9 |
| 4,674,036 | 6/1987 | Conforti ................................... | 364/200 |
| 4,700,381 | 10/1987 | Eher ........................................ | 379/279 |
| 4,737,983 | 4/1988 | Frauenthal et al. ...................... | 379/221 |
| 4,755,995 | 7/1988 | Anderson et al. .......................... | 371/9 |
| 4,805,209 | 2/1989 | Baker, Jr. et al. ..................... | 379/93.23 |
| 4,866,763 | 9/1989 | Cooper et al. ............................ | 379/221 |
| 4,881,261 | 11/1989 | Oliphant et al. ......................... | 379/215 |
| 4,893,301 | 1/1990 | Andrews et al. ........................ | 370/58.2 |
| 4,951,310 | 8/1990 | Honda et al. ............................ | 379/266 |
| 4,988,209 | 1/1991 | Davidson et al. ....................... | 370/58.2 |
| 5,008,930 | 4/1991 | Gawrys et al. .......................... | 379/211 |
| 5,023,868 | 6/1991 | Davidson et al. ......................... | 370/62 |
| 5,031,211 | 7/1991 | Nagai et al. ............................. | 379/221 |
| 5,036,535 | 7/1991 | Gechter et al. .......................... | 379/210 |
| 5,062,103 | 10/1991 | Davidson et al. ....................... | 370/58.1 |
| 5,073,890 | 12/1991 | Danielsen ................................ | 370/58.2 |
| 5,113,430 | 5/1992 | Richardson, Jr. et al. ................ | 379/88 |

(List continued on next page.)

FOREIGN PATENT DOCUMENTS

| | | |
|---|---|---|
| 0 424 015 A2 | 4/1991 | European Pat. Off. . |
| 0 539 104 A2 | 4/1993 | European Pat. Off. . |

(List continued on next page.)

*Primary Examiner*—Scott Wolinsky
*Attorney, Agent, or Firm*—Finnegan, Henderson, Farabow, Garrett & Dunner, L.L.P.

[57] ABSTRACT

A call servicing system allows service agents to service calls from customers. The system includes local customer switches, local agent switches, and a customer database connected to a network call center. The local customer switches direct calls to and from the customers and the local agent switches direct calls to and from the service agents. The customer database stores information regarding the customers sending the calls. The network call center receives a call from a first one of the customers, queries the customer database to retrieve customer information corresponding to the first customer, and concurrently routes the customer call and the corresponding customer information to one of the service agents.

10 Claims, 4 Drawing Sheets

U.S. PATENT DOCUMENTS

| | | | |
|---|---|---|---|
| 5,153,909 | 10/1992 | Beckle et al. | 379/265 |
| 5,175,866 | 12/1992 | Childress et al. | 455/8 |
| 5,193,110 | 3/1993 | Jones et al. | 379/94 |
| 5,206,903 | 4/1993 | Kohler et al. | 379/309 |
| 5,214,688 | 5/1993 | Szlam et al. | 379/67 |
| 5,271,058 | 12/1993 | Andrews et al. | 379/210 |
| 5,291,492 | 3/1994 | Andrews et al. | 370/110.1 |
| 5,291,550 | 3/1994 | Levy et al. | 379/242 |
| 5,291,551 | 3/1994 | Conn et al. | 379/265 |
| 5,299,260 | 3/1994 | Shaio | 379/265 |
| 5,309,505 | 5/1994 | Szlam et al. | 379/88 |
| 5,309,513 | 5/1994 | Rose | 379/265 |
| 5,317,627 | 5/1994 | Richardson, Jr. et al. | 379/88 |
| 5,335,268 | 8/1994 | Kelly, Jr. et al. | 379/112 |
| 5,335,269 | 8/1994 | Steinlicht | 379/266 |
| 5,341,374 | 8/1994 | Lewen et al. | 370/85.4 |
| 5,353,339 | 10/1994 | Scobee | 379/207 |
| 5,355,403 | 10/1994 | Richardson, Jr. et al. | 379/88 |
| 5,392,345 | 2/1995 | Otto | 379/265 |
| 5,392,346 | 2/1995 | Hassler et al. | 379/265 |
| 5,402,474 | 3/1995 | Miller et al. | 379/93 |
| 5,404,350 | 4/1995 | DeVito et al. | 370/16 |
| 5,450,482 | 9/1995 | Chen et al. | 379/207 |
| 5,452,350 | 9/1995 | Reynolds et al. | 379/220 |
| 5,459,780 | 10/1995 | Sand | 379/265 |
| 5,469,504 | 11/1995 | Blaha | 379/265 |
| 5,526,353 | 6/1996 | Henley et al. | 370/60.1 |
| 5,546,452 | 8/1996 | Andrews et al. | 379/219 |
| 5,555,299 | 9/1996 | Maloney et al. | 379/212 |
| 5,633,924 | 5/1997 | Kaish et al. | 379/266 |
| 5,684,870 | 11/1997 | Maloney et al. | 379/265 |
| 5,696,809 | 12/1997 | Voit | 379/265 |
| 5,721,770 | 2/1998 | Kohler | 379/266 |
| 5,740,240 | 4/1998 | Jolissaint | 379/265 |
| 5,825,869 | 10/1998 | Brooks et al. | 379/265 |

FOREIGN PATENT DOCUMENTS

| | | |
|---|---|---|
| 0 545 226 | 6/1993 | European Pat. Off. . |
| 0 647 051 A1 | 9/1994 | European Pat. Off. . |
| 0 622 938 A2 | 11/1994 | European Pat. Off. . |
| 0 710 042 A2 | 5/1996 | European Pat. Off. . |
| 0 753 956 | 1/1997 | European Pat. Off. . |
| 0 802 665 A2 | 10/1997 | European Pat. Off. . |
| 2 298 761 | 9/1996 | United Kingdom . |
| WO 94/00945 | 1/1994 | WIPO . |
| WO 98/01987 | 1/1998 | WIPO . |

OTHER PUBLICATIONS

Giordano et al., "PCS Number Portability", IEEE/ICCC, pp. 1146–1150, 1994.

Japanese Patent Abstract Publication No. 07170288, dated Jul. 4, 1995.

Harvey, D.E. et al., "Call Center Solutions," AT&T Technical Journal, vol. 70, No. 5, Sep. 1, 1991, pp. 36–44.

CALL CENTER INTEGRATION WITH OPERATOR SERVICES DATABASES

RELATED APPLICATIONS

This application is a continuation-in-part of U.S. patent application Ser. No. 08/760,111, filed Dec. 3, 1996, and related to U.S. patent application Ser. No. 08/833,990, filed Apr. 11, 1997 both of which are incorporated by reference.

BACKGROUND OF THE INVENTION

The present invention relates generally to call management and more particularly to call center technology that permits agents to provide quick and informed customer service.

Many businesses use agents or operators to service customers by telephone. These businesses often employ several agents connected to an Automatic Call Distribution (ACD) system, such as a Meridians® ACD manufactured by Northern Telecom, Ltd., to handle multiple calls simultaneously. The call center technology distributes the calls (usually dialed with an 800 number) to the agents.

There are three principal types of call center technology: standalone ACDs, ACDs integrated with a Private Branch Exchange (PBX), and central office based ACDs. The most commonly used type is the ACD integrated with a PBX.

Conventional call centers require agents to ask customers for information, such as the customer's name and address. The customer may also request service in a language other than English. Conventional call centers typically require agents to collect this information through verbal dialogue with the customer.

Telephone companies store callers' names and addresses in databases for access by telephone company operators responding to directory assistance requests from callers. The databases are typically regional databases, updated on a daily basis to maintain current and accurate information. Operators seeking caller information usually access the databases using the caller's name or address.

Telephone companies also maintain a second set of regional databases accessed by calling telephone number or Directory Number (DN). These databases are called Line Information Databases (LIDB). LIDBs contain numerous data segments, including, for example, information regarding the kind of calling telephone (e.g., coin, coinless, etc.), the language preference of the DN owner, and the desire of the DN owner for automated telephone services.

Conventional call centers, however, have no access to the telephone companies' databases. Therefore, agents must obtain this information on their own through verbal interaction with customers. The collection of the information in this manner is time consuming for both the customer and the agent, and therefore costly. Additionally, the verbally collected information commonly contains errors due to mistakes made by the agents in collecting the information.

SUMMARY OF THE INVENTION

The present invention addresses this problem by collecting customer information beforehand so as to present the information to the agent before or at substantially the same time as the agent receives the customer's call requesting service.

In accordance with the purpose of the invention as embodied and broadly described herein, the call servicing system according to the principles of the present invention allows service agents to service calls from customers. The system includes local customer switches, local agent switches, and a customer database connected to a network call center.

The local customer switches direct calls to and from the customers and the local agent switches direct calls to and from the service agents. The customer database stores information regarding the customers sending the calls. The network call center receives a call from a first one of the customers, queries the customer database to retrieve customer information corresponding to the first customer, and concurrently routes the customer call and the corresponding customer information to one of the service agents.

BRIEF DESCRIPTION OF THE DRAWINGS

The accompanying drawings, which are incorporated in and constitute a part of this specification, illustrate an embodiment of the invention and, together with the description, explain the objects, advantages and principles of the invention. In the drawings.

DETAILED DESCRIPTION OF THE PREFERRED EMBODIMENTS

The following detailed description of the invention refers to the accompanying drawings that illustrate preferred embodiments consistent with this invention. Other embodiments are possible and changes may be made to the embodiments without departing from the spirit and scope of the invention. The following detailed description does not limit the invention. Instead, the scope of the invention is defined only by the appended claims.

Systems and methods consistent with the principles of the present invention facilitate agent servicing by presenting an agent with customer information before or at substantially the same time as the agent receives the customer's call.

I. Network Elements.

Figure 1:
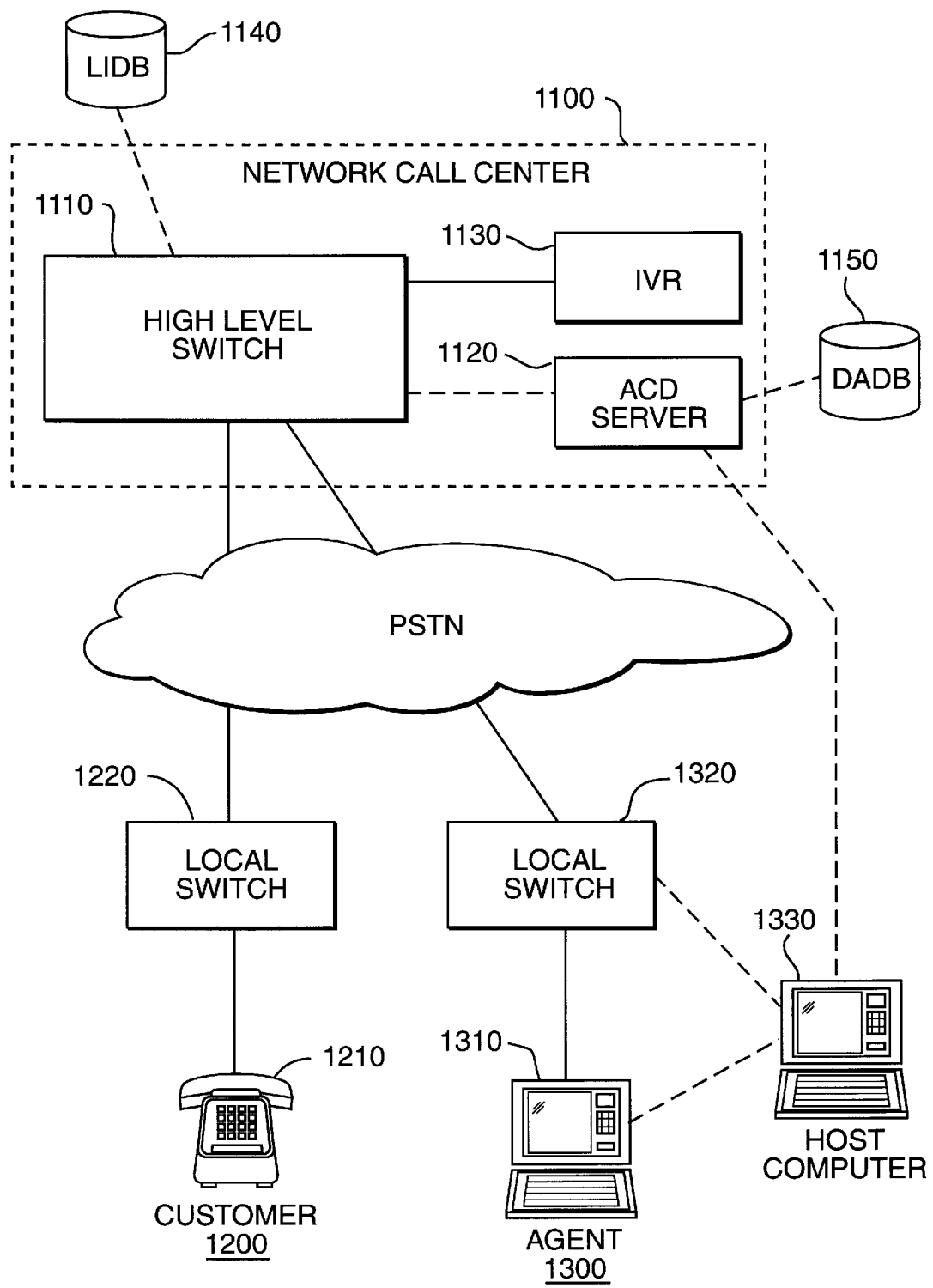
FIG. 1 is a diagram of a communications network consistent with the principles of the present invention.

FIG. 1 is a block diagram of a communications network consistent with the principles of the present invention. Network Call Center NCC) 1100 connects customer 1200 to agent 1300 of a virtual team of agents. A single customer and a single agent have been shown for simplicity only. The present invention does not depend on a specific number of customers and agents, but encompasses any number of customers and agents connected to any switch in the network.

Customer 1200 uses a conventional telephone 1210 to communicate with an agent of the virtual agent team through NCC 1100 via the public network, such as the Public Switched Telephone Network (PSTN). Switch 1220 is a standard PBX or Class 5 telephone switch, and connects customer 1200 to NCC 1100 over a standard telephone line.

Multiple types of connections exist for connecting an agent of the virtual agent team to NCC 1100: (1) via a local switch having no ACD functionality; and (2) via a local switch having ACD functionality. Business considerations and the physical locations of the agents play a role in deciding the best type of connection. The communications network of FIG. 1 shows agent 1300 connected through a local switch having no ACD functionality (switch 1320).

Agent 1300 may use a number of different telephone line terminals to service customer calls. The telephone line terminals may include a standard telephone (not shown) or computer 1310 with a telephony card installed. Agent computer 1310 connects to NCC 1100 via switch 1320 and the PSTN. Switch 1320 is a standard PBX or Class 5 switch without ACD functionality.

The specific type of connection between agent computer 1310 and switch 1320 depends on business considerations and the physical location of the agent. The different types of connections that might be established between agent computer 1310 and switch 1320 are described in detail in related applications Ser. Nos. 08/760,111 and 08/33,990.

NCC 1100 controls the routing of calls from customer 1200 to agent 1300. FIG. 1 shows NCC 1100 as including High Level Switch (HLS) 1110, ACD server 1120, and Interactive Voice Response unit (IVR) 1130. NCC 1100 includes data connections to two databases, LIDB 1140 and Directory Assistance Database (DADB) 1150. LIDB 1140 stores numerous data segments retrieved using the calling telephone number, including, but not limited to, information about the kind of calling telephone, the language preference of the DN owner, that is, the owner of the calling telephone number, and the desire of the DN owner for automation of telephone services. DADB 1150, on the other hand, stores customer information retrieved using the calling telephone number, including, but not limited to, customer name and address information.

HLS 1110 is a network switch, such as a DMS Traffic Operator Position System (TOPS) switch manufactured by Northern Telecom, Ltd., that routes calls from customer 1200 to agent 1300 of a virtual team of agents, and queries LIDB 1140 for data segments corresponding to the customer. A data segment is simply a group of information corresponding to a particular calling telephone or DN owner. HLS 1110 preferably contains an interface that facilitates communication with ACD server 1120 to allow ACD server 1120 to control the routing of calls.

ACD server 1120 includes a computer with an Ethernet-equivalent data connection to HLS 1110 and IVR 1130. ACD server 1120 can include an IBM-compatible computer executing Windows NT™, but might alternatively include a UNIX™-capable computer, such as an HP model or the IBM Risc 6000.

ACD server 1120 queues customer calls, records information regarding the availability of agents, controls call routing by HLS 1110 and the operation of IVR 1130, provides Management Information System (MIS) data, and queries DADB 1150 for customer information. ACD server 1120 also processes network events reported by HLS 1110, and takes appropriate action, such as rerouting calls and releasing called trunks due to busy conditions, for example.

Figure 2:
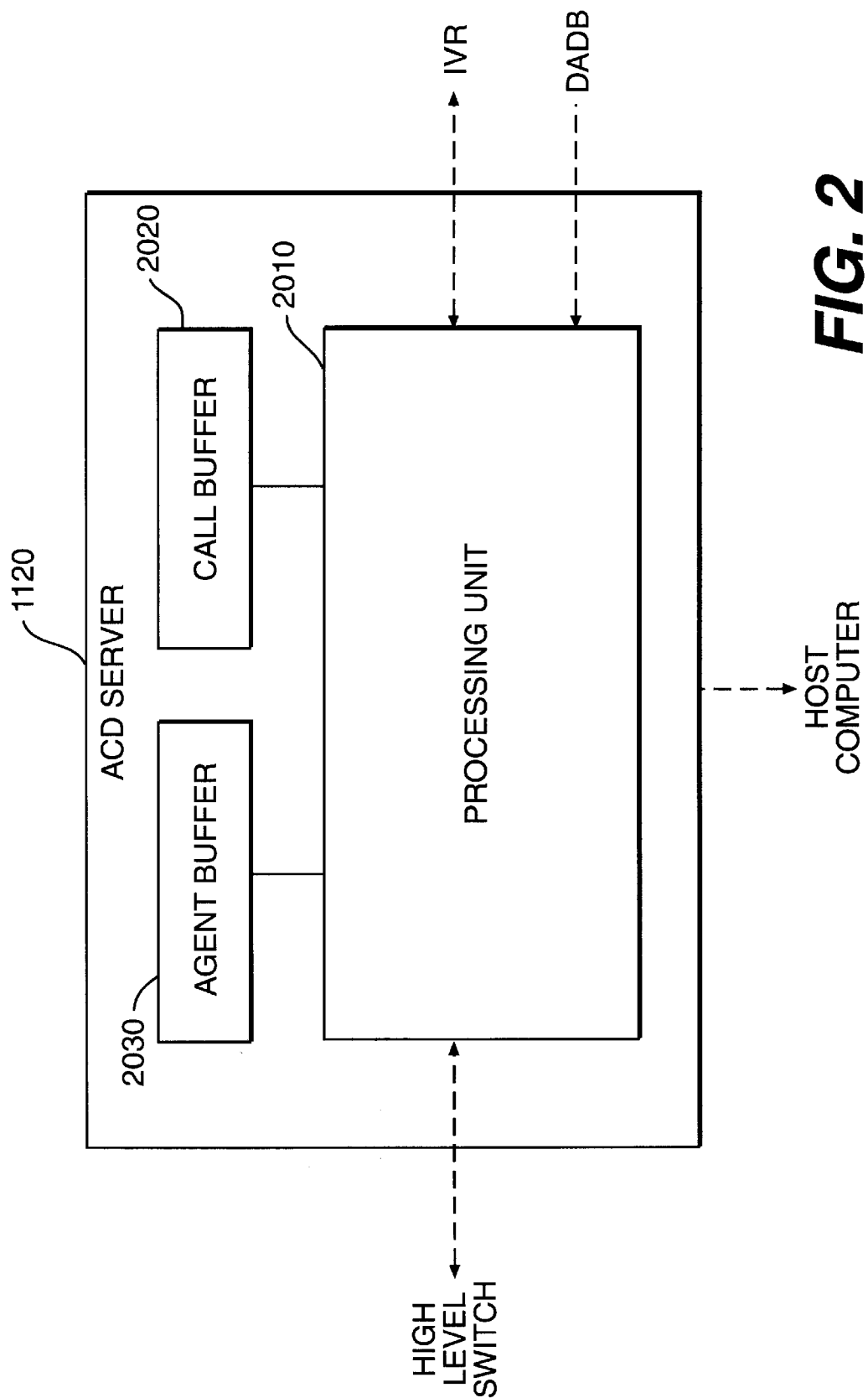
FIG. 2 is a diagram of the components comprising the ACD Server of FIG. 1.

FIG. 2 is a block diagram showing the components of ACD server 1120, including processing unit 2010, call buffer 2020, and agent buffer 2030. Processing unit 2010 tracks agent availability and handles the processing of customer calls, including the queuing of such calls in call buffer 2020, the retrieval of customer information corresponding to the calls from DADB 1150, and the routing of the calls to available agents.

Call buffer 2020 preferably includes several call queues arranged by specific categories, such as agent team, or specific customer call criteria including the desired language of the customer. The call queues may also contain priority call queues for faster service by the agents. A call may be placed in a priority call queue, for example, after it has waited in call buffer 2020 longer than a predetermined period of time.

Agent buffer 2030 preferably contains several agent queues arranged, for example, by agent team. Each agent queue contains values representing idle agents waiting for a call to service. Similar to the call queues, the agent queues may contain priority agent queues that are searched first when a new call arrives needing service.

The particular queues within call buffer 2020 of calls that an agent services and the queues within agent buffer 2030 of available agents are predetermined by the operating telephone company, on behalf of the call center service provider. Agents may need to service multiple queues or just one queue. Agents may also need to service different queues at different priorities.

Returning to FIG. 1, IVR 1130 includes a computer, such as a personal computer or a larger mainframe computer, with a voice connection to HLS 1110. IVR 1130 collects information from the customers to aid ACD server 1120 in categorizing the customer calls, storing them in a proper call queue in ACD server 1120, and directing them to an appropriate agent. IVR 1130 plays announcements or music for the customers while awaiting service in a call queue. IVR 1130 might also interact with agents to collect agent status information, such as agent log-on, log-off, availability, and unavailability data.

II. Processing

Figure 3A:
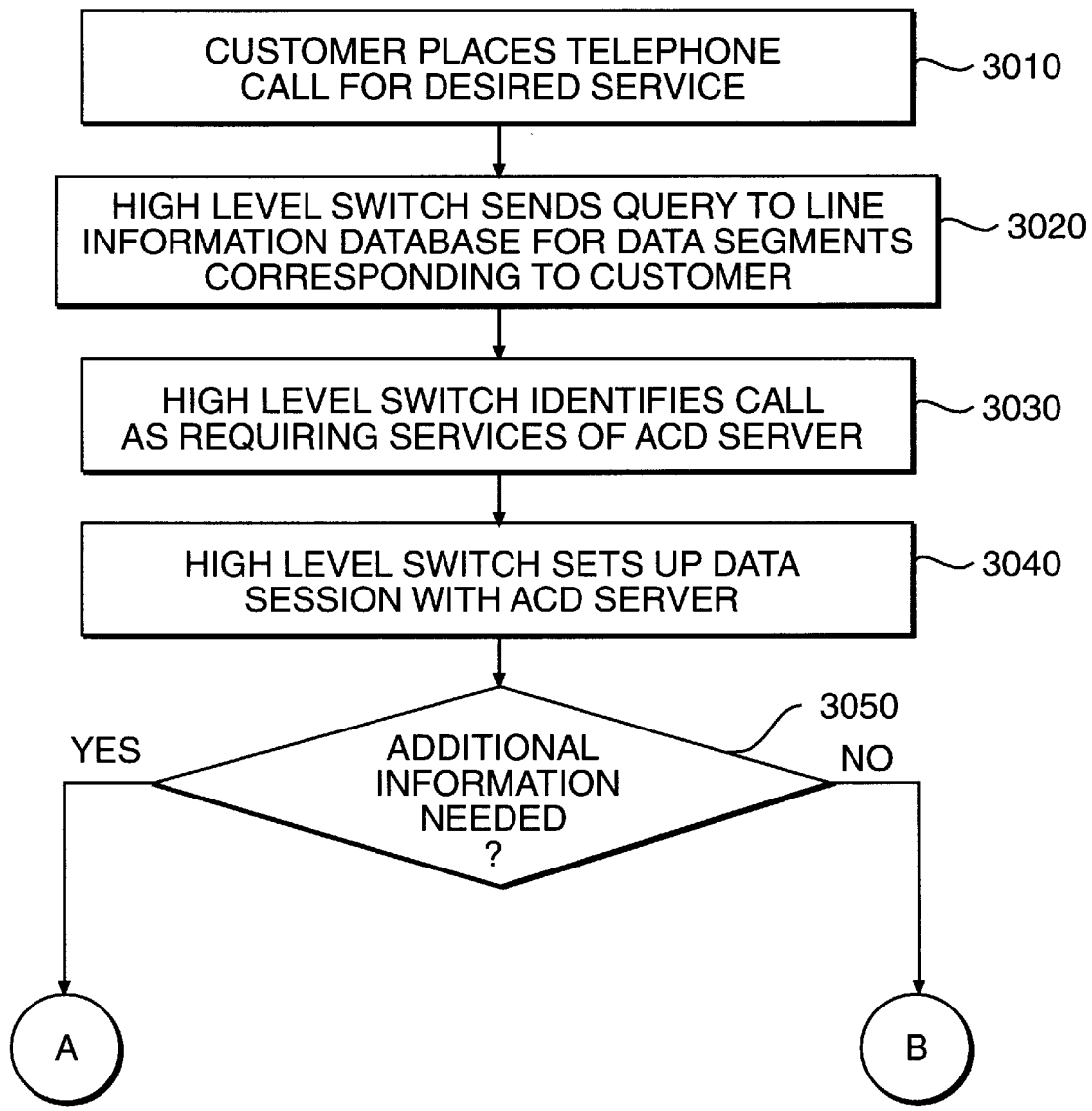
FIGS. 3A and 3B contain a flowchart of the call flow activity consistent with the principles of the present invention.
Figure 3B:
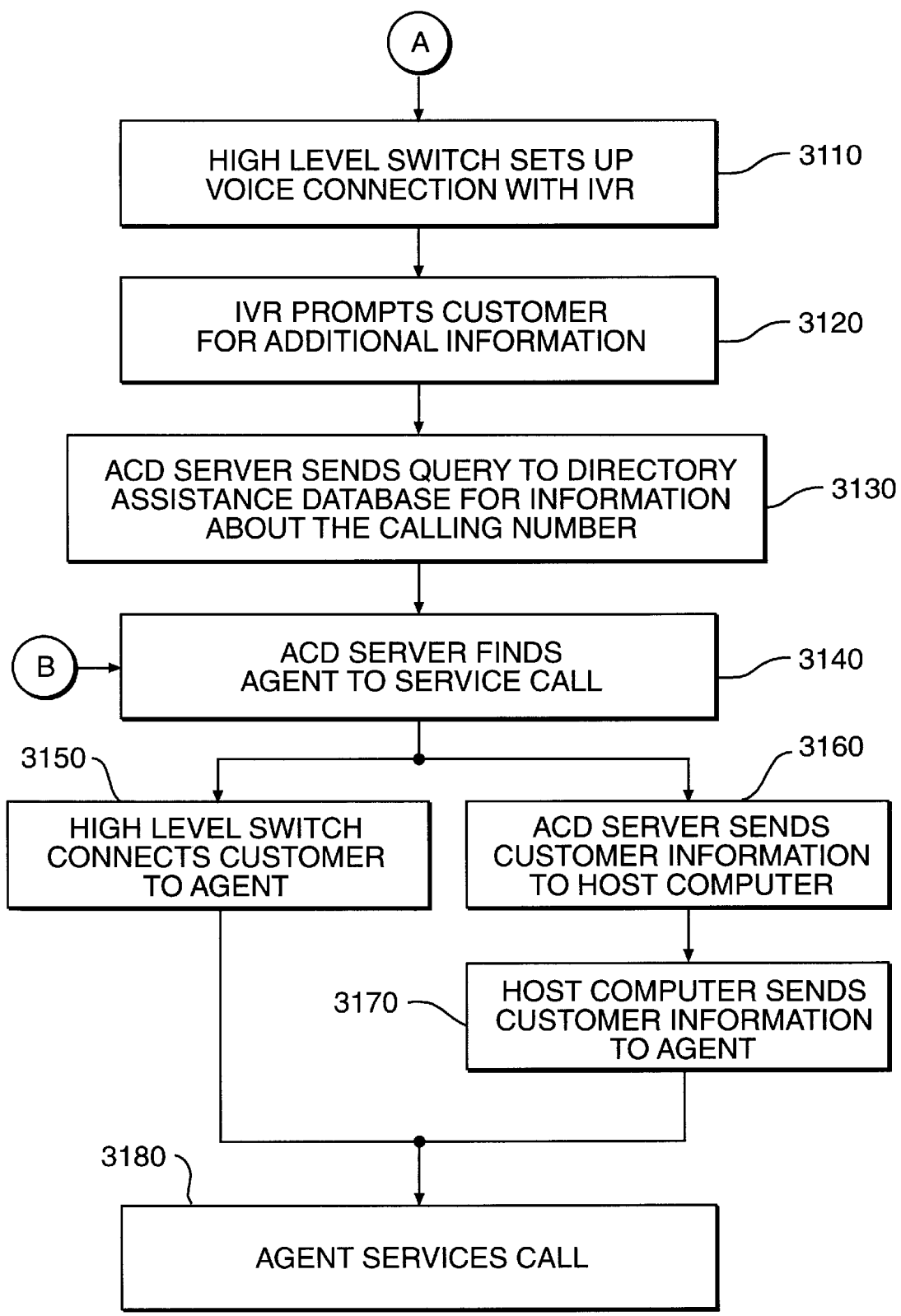

FIGS. 3A and 3B contain a flowchart illustrating the call flow activity consistent with the principles of the present invention.

The flowchart of FIGS. 3A and 3B assume that agent 1300 has already logged onto the system and awaits a customer call. The process for logging onto the system is described in detail in related applications Ser. Nos. 08/760,111 and 08/833,990.

A customer, such as customer 1200, places a voice call for a desired service, such as to make a reservation or to order a product [step 3010]. To place the voice call, customer 1200 dials a telephone number, typically a toll free number, for the service that customer 1200 desires.

Switch 1220 routes customer 1200's call to NCC 1100 through the PSTN. HLS 1110 receives the call and sends a query to LIDB 1140 using a Common Channel Signaling number 7 (CCS7) truck to retrieve data segments corresponding to customer 1200's calling telephone number [step 3020]. The data segments include, for example, a language preference of the DN owner, i.e., the customer. HLS 1110 suspends call processing until LIDB 1140 responds with the desired data segments.

Based on the data segments from LIDB 1140, HLS 1110 identifies the call as one that requires the services of ACD server 1120 [step 3030]. HLS 1110 then sets up a data session with ACD server 1120 [step 3040], and sends ACD server 1120 call information, including the calling and called telephone numbers and the data segments retrieved from LIDB 1140.

At this point, ACD server 1120 may desire to collect additional information from customer 1200 [step 3050]. The criteria for collecting additional information is preferably preestablished, such that ACD server 1120 might always desire to collect additional information or might desire to collect additional information only from customers who have not previously called for the particular service.

If ACD server 1120 desires additional information from customer 1200, ACD server 1120 directs HLS 1110 to set up a voice connection to IVR 1130 [step 3110]. Once HLS 1110 connects customer 1200's call to IVR 1130, ACD server 1120 instructs IVR 1130 to prompt customer 1200 for the desired information using a language consistent with the retrieved data segments [step 3120]. While IVR 1130 interacts with customer 1200, ACD server 1120 sends a query to DADB 1150 using an Ethernet-equivalent data connection to retrieve the name and address corresponding to the calling telephone number [step 3130].

Using the collected information, including the call information and the information collected from customer 1200, ACD server 1120 finds the next available agent, such as agent 1300, from the agent queues that has the necessary skills to service customer 1200 [step 3140]. Once ACD server 1120 finds agent 1300 as the next available agent, ACD server 1120 instructs HLS 1110 to connect customer 1200 to agent 1300 through the PSTN [step 3150]. At the same time, ACD server 1120 sends a data message to host computer 1330 associated with agent 1300 [step 3160]. The data message includes the data collected by ACD server 1120 which would be useful to agent 1300 in servicing customer 1200, including, for example, the customer name and address.

Host computer 1330 sends the data message for display on agent computer 1310 [step 3170]. Agent 1300 receives the data message from host computer 1330 before, or at substantially the same time, as agent 1300 receives the customer call. Agent 1300 then services the call [step 3180].

If, on the other hand, ACD server 1120 determines that additional information from customer 1200 is not needed [step 3050], ACD server 1120 finds the next available agent, such as agent 1300, from the agent queues that has the necessary skills to service customer 1200 based on the information ACD server 1120 has regarding customer 1200 [step 3140].

Once ACD server 1120 finds agent 1300 as the next available agent, ACD server 1120 instructs HLS 1110 to connect customer 1200's call to agent 1300 through the PSTN [step 3150]. Concurrently, ACD server 1120 sends a data message to host computer 1330 [step 3160]. Host computer 1330, in turn, sends the data message for display on agent computer 1310 [step 3170]. Agent 1300 then services the call [step 3180].

The call flow activity described above may be slightly different if agent 1300 connects to NCC 1100 via a local switch having ACD functionality because extra processing is sometimes required to coordinate the data message sent from ACD server 1120 with the voice call arriving at the local ACD switch. This is particularly true when the customer's calling number does not uniquely identify the customer. When coordination is needed, ACD server 1120 might instruct HLS 1110 to replace customer 1200's true calling number, or some other parameter, with a call identifier created by ACD server 1120.

ACD server 1120 then includes this call identifier in the data message sent to host computer 1330. HLS 1110 also includes the call identifier with the voice call sent through the PSTN using a standard CCS7 trunk to the local ACD switch. When the voice call arrives, the local ACD switch sends the call identifier to host computer 1330. In response, host computer 1330 sends the relevant data to agent 1300.

III. Conclusion

The systems and methods according to the principles of the present invention support agent servicing functions by providing agents with customer information to allow agents to service customer calls properly and expeditiously.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, a network level switch has been described as providing the call management functionality. However, this need not be the case. The call management functionality might alternatively be provided by a local switch. Furthermore, the ACD Server has been described as containing the customer and agent queues. However, the High Level Switch might alternatively provide this queuing.

The scope of the invention is defined by the following claims and their equivalents.

What is claimed is:

1. A call servicing system for allowing service agents coupled to agent switches to service calls from customers coupled to customer switches, the system comprising:

a first customer database configured to store first information regarding the customers;

a second customer database configured to store second information, different from the first customer information, regarding the customers; and a network call center connected to the customer switches, the agent switches, and the first and second customer databases, the network call center including a high level switch that receives a call from a first one of the customers, that queries the first customer database to retrieve first customer information corresponding to the first customer, and that routes the customer call to a selected one of the service agents; and an automatic call distribution (ACD) server that selects one of the service agents to handle the customer call based on the first customer information, that queries the second customer database to retrieve second customer information corresponding to the first customer, and that routes the second customer information concurrently with the routing of the customer call to the selected service agent to facilitate servicing of the customer call.

2. The system of claim 1, further comprising at least one host computer connected to the network call center and the service agents, and wherein the high level switch includes means for routing the customer call to the selected service agent via one of the agent switches; and wherein the ACD server includes means for sending the second customer information to the one service agent via the host computer.

3. A method for managing calls at a network call center coupled to first and second databases, the network call center including a network switch connected to an automatic call distribution (ACD) server, comprising the steps of:

receiving, at the network switch, a call from a customer requesting service;

querying a first database by the network switch to retrieve first customer information corresponding to the customer;

selecting, by the ACD server, a service agent that can process the customer call based on the first customer information;

querying a second database by the ACD server to retrieve second customer information corresponding to the customer;

sending the customer call from the network switch to the selected service agent; and sending the second customer information concurrently with the customer call from the ACD server to the selected service agent to permit the selected service agent to expeditiously service the customer call.

4. The method of claim 3, further comprising the step of detecting, by the network switch, call information from the received customer call, and wherein the selecting step includes the substep of determining a service agent that can process the customer call based on the detected call information and the first customer information.

5. A network call center for facilitating processing of service calls from customers coupled to customer switches by service agents coupled to agent switches, the network call center comprising:

a network switch connected to the customer switches and to the agent switches, the network switch including means for receiving the service calls from the customers, means for detecting call information from the service calls, means for querying a first database to retrieve first customer information regarding the customers, and means for routing the service calls to the service agents via the agent switches; and an Automatic Call Distribution (ACD) server, connected to the network switch, and including means for receiving the call information and the first customer information from the network switch, means for queuing the service calls, means for querying a second database to retrieve second customer information corresponding to the service calls, means for controlling the routing of the service calls by the network switch, and means for sending the second customer information to the service agents to facilitate processing of the service calls.

6. The network call center of claim 5, wherein the ACD server includes means for sending the second customer information to one of the service agents substantially concurrently with the network switch routing a corresponding one of the service calls to the one service agent.

7. In a network for routing calls from customers coupled to customer switches to service agents coupled to agent switches, an Automatic Call Distribution (ACD) server controlling a network switch coupled to the customer and agent switches, and comprising:

means for receiving call information and first customer information from the network switch, the call information being information detected by the network switch regarding a call received from one of the customers, the first customer information being information obtained from a first database by the network switch corresponding to the customer;

means for querying a second database to retrieve second customer information, different from the first customer information;

means for determining one of the service agents that can service the call using the call information and the first customer information;

means for generating a data message including the second customer information;

means for sending the data message to the determined service agent; and means for instructing the network switch to route the call to the determined service agent via a corresponding one of the agent switches.

8. The ACD server of claim 7, wherein the sending means includes means for sending the data message to the determined service agent substantially concurrently with the network switch routing the call to the determined service agent.

9. A method for routing calls from customers coupled to customer switches to service agents coupled to agent switches, an Automatic Call Distribution (ACD) server controlling a network switch coupled to the customer and agent switches, the method executed by the ACD server and comprising the steps of:

receiving call information and first customer information from the network switch, the call information being information detected by the network switch regarding a call received from one of the customers, the first customer information being information obtained from a first database by the network switch corresponding to the customer;

querying a second database to retrieve second customer information, different from the first customer information;

determining one of the service agents that can service the call using the call information and the first customer information;

generating a data message including the second customer information;

sending the data message to the determined service agent; and instructing the network switch to route the call to the determined service agent via a corresponding one of the agent switches.

10. The method of claim 9, wherein the sending step includes the substep of sending the data message to the determined service agent substantially concurrently with the network switch routing the call to the determined service agent.

* * * * *